(No Model.)

J. M. COLLINS.
THILL COUPLING.

No. 262,741. Patented Aug. 15, 1882.

Attest:
Saml. S. Boyd
Charles Pickles

Inventor:
John M. Collins
by C. D. Moody
atty.

United States Patent Office.

JOHN M. COLLINS, OF ST. LOUIS, MISSOURI.

THILL-COUPLING.

SPECIFICATION forming part of Letters Patent No. 262,741, dated August 15, 1882.

Application filed March 10, 1882. (No model.)

*To all whom it may concern:*

Be it known that I, JOHN M. COLLINS, of St. Louis, Missouri, have made a new and useful Improvement in Thill-Couplings, of which the following is a full, clear, and exact description, reference being had to the annexed drawings, making part of this specification, in which—

Figure 1:
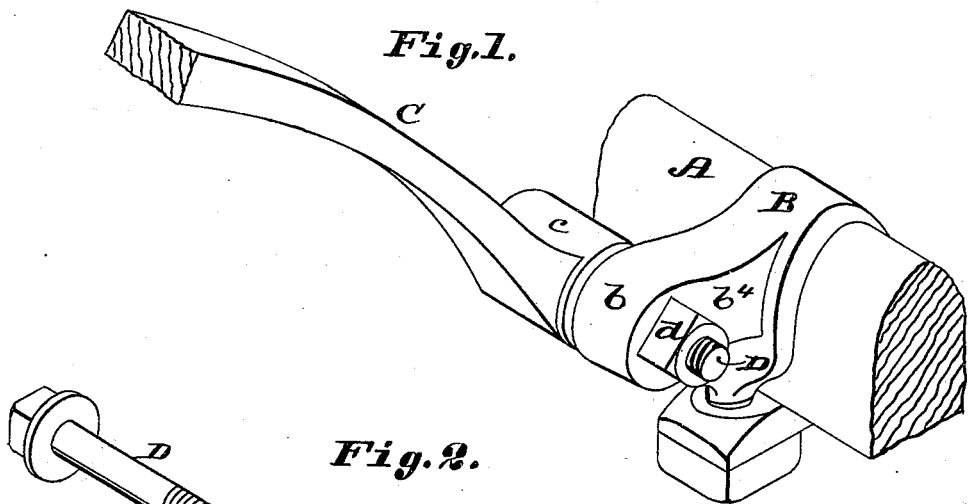
Figure 2:
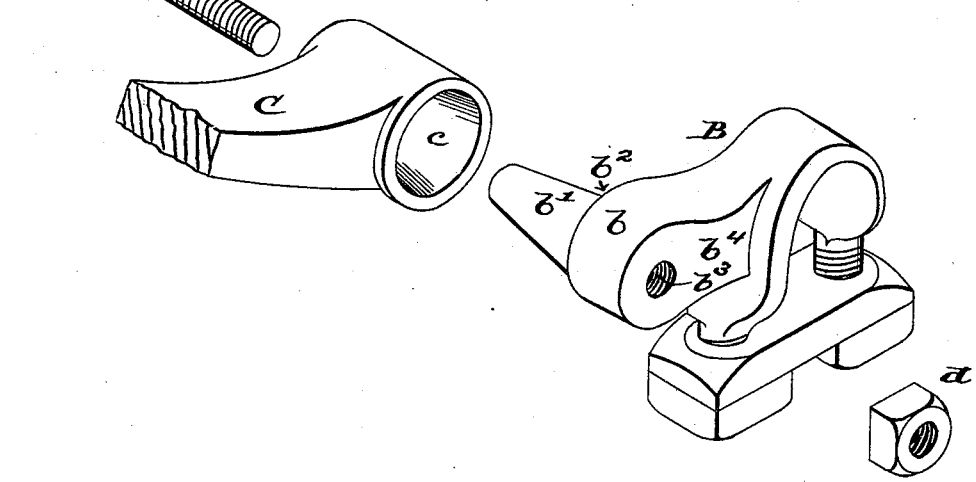

Figure 1 is a view in perspective of the improved coupling; Fig. 2, a view in perspective, showing the various parts used in forming the coupling, but detached from each other; and Fig. 3, a sectional view of the coupling.

The same letters denote the same parts.

The present invention is an improved means for preventing thill-couplings from rattling.

In the present device the thill-iron has a tapered eye fitted to a bearing of corresponding shape upon the axle-clip, the improvement consisting, in combination with such parts, of the means employed in securing them in position.

Figure 3:
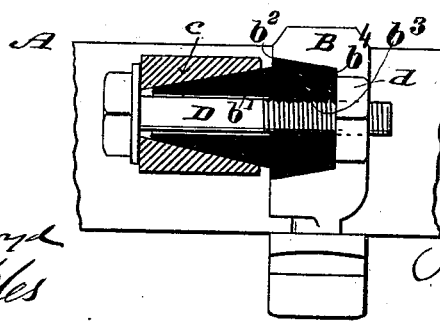

In the annexed drawings, A represents the axle, B the axle-clip, and C the thill-iron. The clip has an extension, $b$, upon the side of which is a conoidal bearing, $b'$. The thill-iron eye $c$ is shaped correspondingly to fit the bearing $b'$, the two parts being combined in the manner shown in Fig. 3 and held together by the bolt D. As the parts are originally fitted, the thill-iron does not come closely against the shoulder $b^2$ at the inner end of the bearing $b'$, space being left for slipping the thill-iron eye from time to time, as the parts become worn, farther onto the clip-bearing. The bearing $b'$ and extension $b$ are perforated longitudinally to receive the bolt D, as shown in Figs. 1 and 3, the bolt passing through the eye, clip-bearing, and extension, and having a nut, $d$, upon its inner end. The nut, however, is in effect a lock-nut, for I have ascertained in practice that it will not answer to simply pass the bolt through the clip and rely upon the nut for holding the parts in place, for when thus made the thill-iron works loose. Accordingly, the perforation in the clip at $b^3$ is threaded to enable the bolt to engage therewith, the bolt being screwed into the clip at the point $b^3$ and sufficiently to bring the thill-iron eye into the desired position upon the clip-bearing, and then the nut $d$ is screwed against the face $b^4$ of the clip, in which position it acts as a lock-nut and effectually prevents the bolt from unscrewing in the clip.

I am aware that a conical bolt has been used in the conical eye of the carriage-shaft; also, that a clip having two conical projections, adapted to fit like depressions, one on each side of the end of the arm of the shaft, and I do not claim such construction.

I claim—

The combination of the thill-iron C, having a conoidal eye, $c$, extending across its end, and the headed bolt D and nut $d$, with the clip B, having extension $b$, and conoidal bearing $b'$, adapted to extend nearly through eye $c$, its central perforation screw-threaded at $b^3$, all substantially as shown and described.

JOHN M. COLLINS.

Witnesses:
C. D. MOODY,
CHARLES PICKLES.